(12) United States Patent  
Huang et al.

(10) Patent No.: US 10,786,903 B2  
(45) Date of Patent: Sep. 29, 2020

(54) MAP CREATION SYSTEM AND METHOD THEREOF FOR MOVABLE ROBOT

(71) Applicant: INSTITUTE OF NUCLEAR ENERGY RESEARCH, ATOMIC ENERGY COUNCIL, EXECUTIVE YUAN, Taoyuan (TW)

(72) Inventors: Chung-Hao Huang, Taoyuan (TW); Yu-Hsiang Hung, Taoyuan (TW); Chiung-Wei Huang, Taoyuan (TW); Cheng-Yuan Chang, Taoyuan (TW)

(73) Assignee: Institute of Nuclear Energy Research, Atomic Energy Council, Executive Yuan, Taoyuan (TW)

( * ) Notice: Subject to any disclaimer, the term of this patent is extended or adjusted under 35 U.S.C. 154(b) by 310 days.

(21) Appl. No.: 15/900,749

(22) Filed: Feb. 20, 2018

(65) Prior Publication Data

US 2019/0105773 A1 Apr. 11, 2019

(30) Foreign Application Priority Data

Oct. 5, 2017 (TW) .............................. 106134415 A (51) Int. Cl.
*B25J 9/16* (2006.01)
*G05D 1/02* (2020.01)
(Continued)

(52) U.S. Cl.
CPC ........... *B25J 9/1666* (2013.01); *B25J 9/0009* (2013.01); *B25J 9/065* (2013.01); *B25J 9/1697* (2013.01);
(Continued)

(58) Field of Classification Search
CPC ........ B25J 9/1666; B25J 9/0009; B25J 9/065; B25J 9/1697; G05D 1/0246;
(Continued)

(56) References Cited

U.S. PATENT DOCUMENTS 7,387,179 B2 * 6/2008 Anhalt .................... B08B 9/045  
                                                         180/9.1  
8,571,711 B2 * 10/2013 Jacobsen ................. B08B 9/045  
                                                        180/9.21

(Continued)

OTHER PUBLICATIONS

Tuncer et al., A Motion Planning System for Mobile Robots, Feb. 2012, Article in Advances in Electrical and Computer Engineering, ResearchGate, vol. 12, No. 1,2012, pp. 57-62 (Year: 2012).*

(Continued)

*Primary Examiner* — Jaime Figueroa  
(74) *Attorney, Agent, or Firm* — Wang Law Firm, Inc.

(57) ABSTRACT

The present disclosure illustrates a map creation system and a method for a movable robot. The map creation system includes a movable robot and a display device. The movable robot includes a robot body; a driving unit driving the robot body to move in a space; an image capturing unit capturing a image in the space; a sampling unit sampling in the space to obtain a sample; a control unit controlling the operation of the driving unit, the image capturing unit and the sampling unit; and a power supply unit supplying an electrical power to each unit. The display device displays the received image and marks a location in the space where the sample is obtained on the image, and synchronously displays a movement trace of the movable robot in the space according to the driving instructions of the driving unit.

9 Claims, 5 Drawing Sheets

(51) Int. Cl.
 *B25J 9/06* (2006.01)
 *B25J 9/00* (2006.01)
(52) U.S. Cl.
 CPC ......... *G05D 1/0246* (2013.01); *G05D 1/0274* (2013.01); *G05D 2201/0207* (2013.01); *Y10S 901/01* (2013.01); *Y10S 901/09* (2013.01); *Y10S 901/47* (2013.01)
(58) Field of Classification Search
 CPC .......... G05D 1/0274; G05D 2201/0207; Y10S 901/09; Y10S 901/01; Y10S 901/47
 USPC ................................................. 700/245, 259
 See application file for complete search history.

(56) References Cited

U.S. PATENT DOCUMENTS

| | | | | |
|---|---|---|---|---|
| 8,974,372 | B2* | 3/2015 | Fell | A61B 34/30 600/114 |
| 9,149,929 | B2* | 10/2015 | Motzer | B25J 9/162 |
| 9,409,292 | B2* | 8/2016 | Smith | B25J 13/025 |
| 9,463,393 | B2* | 10/2016 | Olivera | A63H 11/12 |
| 9,693,676 | B2* | 7/2017 | Massicotte | A61B 1/041 |
| 2002/0190682 | A1* | 12/2002 | Schempf | G01M 3/005 318/568.11 |
| 2006/0070775 | A1* | 4/2006 | Anhalt | B08B 9/045 180/9.1 |
| 2006/0074525 | A1* | 4/2006 | Close | B25J 9/1617 700/245 |
| 2006/0261771 | A1* | 11/2006 | Anhalt | B08B 9/045 318/568.12 |
| 2012/0197440 | A1* | 8/2012 | Farkavec | B08B 9/049 700/264 |
| 2014/0090506 | A1* | 4/2014 | Tobey | B25J 5/007 74/490.01 |
| 2014/0207417 | A1* | 7/2014 | Messinger | G06Q 10/20 702/187 |
| 2017/0120442 | A1* | 5/2017 | Frei | B25J 9/06 |
| 2018/0283595 | A1* | 10/2018 | Radichel | F16L 55/48 |

OTHER PUBLICATIONS

Hansen et al., Monocular Visual Odometry for Robot Localization in LNG Pipes, 2011 IEEE International Conference on Robotics and Automation Shanghai International Conference Center, May 9-13, 2011, Shanghai, China, pp. 3111-3116 (Year: 2011).*

Trebunsa et al, An inspection of pipe by snake robot, 2016, SAGE, International Journal of Advanced Robotic Systems Sep.-Oct. 2016, pp. 1-12 (Year: 2016).*

Kwon et al, Design and Motion Planning of a Two-Module Collaborative Indoor Pipeline Inspection Robot, Jun. 2012, IEEE Transactions on Robotics, vol. 28, No. 3, pp. 681-696 (Year: 2012).*

Yahya et al., Development and Adaptability of In-Pipe Inspection Robots, 2014 IOSR Journal of Mechanical and Civil Engineering (IOSR-JMCE), vol. 11, Issue 4 Ver. VII (Jul.-Aug. 2014), pp. 1-8 (Year: 2014).*

* cited by examiner

MAP CREATION SYSTEM AND METHOD THEREOF FOR MOVABLE ROBOT

CROSS-REFERENCE TO RELATED APPLICATION

This application claims the benefit of Taiwan Patent Application No. 106134415, filed on Oct. 5, 2017, in the Taiwan Intellectual Property Office, the disclosure of which is incorporated herein in its entirety by reference.

BACKGROUND OF THE INVENTION

1. Field of the Invention

The present disclosure relates to a map creation system and a method thereof, and more particularly, to a map creation system and a method thereof for a movable robot.

2. Description of the Related Art

In recent years, some nuclear power plants in Taiwan are planned to decommission. However, it is very difficult in management, maintenance and repair for internal pipelines of nuclear energy components of the nuclear power plant because the pipelines are disposed densely and have various structures, and it is also unable to enter the pipelines for check, and the check operation must build construction frames and deconstruct adiabator first. For this reason, a robot having advantages of small-size, multiple degrees of freedom, light weight, simple operation, easy installation and repair, is expected to assist in decommissioning nuclear power plant. Besides the nuclear power plant, a petrochemical industry plant must be continuously operated for a long time and cannot be shut down for periodic maintenance and repair anytime, so the petrochemical industry plant also has risks of pipeline corrosion, pipeline breakage, pollution due to pipeline leakage, or fire explosion. If the robot can be applied to detect hazard and re-draw the pipeline map, the hazard risk of the nuclear power plant or the petrochemical industry plant can be greatly reduced.

In the world, Unite State is a country where most nuclear power plants are decommissioned, and there are about 30 nuclear power plants are decommissioned or being decommissioned. The internal pipelines in the nuclear power plant are disposed densely and have various structures, and it is unable to enter the pipeline for check, and check operation must build construction frames and deconstruct adiabator first, so it is very difficult in management, maintenance and repair. As a result, before the decommissioning operation of the nuclear power plant, the multifunctional robot can be applied to draw the pipeline map, detect dose, sample nuclide. Furthermore, there are various transportation pipelines, of which total length is 4.2 million kilometer of on ground or underground in the United States, and the pipeline information is collected and managed by U.S. department of transportation, pipeline and hazardous materials safety administration, so as to provide a communication platform between U.S. state government and industry, and provide transparent information for people.

Therefore, how to safely and efficiently decommissioning nuclear power plant is an important topic. During the process of decommissioning the nuclear power plant. A lot of pipeline robots are required to explore the pipelines, detect and sample radiation; however, most available robots are developed for manufacturing industry, and fewer robots are developed to operate in the pipeline with a small space and highly complicated environment. Each of the internal pipelines of the nuclear energy components in the nuclear power plant has small space and highly-complicated terrain environment. Under a condition that the staff members and large-sized machines are unable to enter the pipeline to explore internal environment, how to transmit critical messages associated with internal environment of the pipeline to outside staff member is very important. However, existing pipeline robot is unable to draw the route map accurately

SUMMARY OF THE INVENTION

In order to solve the conventional problem, an objective of the present disclosure is to provide a map creation system and a method thereof for a movable robot.

In order to achieve the objective, the present disclosure provides a map creation system for a movable robot. The map creation system includes a movable robot, and a display device. The movable robot includes a robot body movably located in the space; a driving unit electrically connected to the robot body and configured to drive the robot body to move in the space; an image capture unit disposed on the robot body and configured to capture the image in the space; a sampling unit disposed on the robot body and configured to perform the sampling operation in the space, to obtain a sample; a control unit disposed on the robot body and electrically connected to the driving unit and the image capture unit, and the sampling unit for control; and a power supply unit disposed on the robot body and electrically connected to the driving unit, the image capture unit, the sampling unit, and the control unit, and configured to provide power. The display device is electrically connected to the movable robot and configured to display the received image, and mark the locations in the space where the sample is obtained, on the image, and simultaneously display a movement trace of the movable robot in the space according to the plurality of driving instruction of the driving unit.

Preferably, the robot body comprises the snake head module, the snake segment module, and the snake tail module which are electrically connected to each other in a sequential order. The snake segment module comprises a plurality of joint units. The image capture unit and the sampling unit are disposed in the snake head module and the snake tail module, respectively. The driving unit comprises the plurality of motors which are disposed in the snake segment module and in series connection with the plurality of joint units.

Preferably, the display device displays each of the movement points of the robot body from an original point to an end point, on the bitmap, and the display device generates a movement trace along which the robot body moves in the space, according to all movement points. A previous movement point and a current movement point are displayed by different the marks.

Preferably, the space where the robot body locates can be a pipeline, and the display device reconstructs the plurality of images, captured by the image capture unit, to form the actual pipeline route map. The display device compares a pre-stored the pipeline plan route map with the actual pipeline route map, and display a comparison result.

Preferably, the robot body further comprises a lighting unit disposed on the robot body and electrically connected to the power supply unit to receive power. The lighting unit is configured to light the space where the robot body locates, to assist the operation of the movable robot.

Preferably, in order to achieve the objective, the present disclosure provides a map creation method for a movable robot, comprise steps of: driving the movable robot to move in a space according to a plurality of action modes; using the movable robot to capture an image of the space where the movable robot locates; using the movable robot to perform a sampling operation in the space where the movable robot locates, to obtain a sample; using a display device to display the image captured by the movable robot, and mark the location where the movable robot performs the sampling operation in the space, on the image displayed by the display device; and, using the display device to display a movement trace of the movable robot in the space.

Preferably, the movable robot comprises a snake head module, a snake segment module and a snake tail module which all are electrically connected to each other in a sequential order. The snake segment module comprises a plurality of joint units.

Preferably, the map creation method further comprises steps of: displaying the movement points of the movable robot from an original point to an end point on the bitmap, and generating a movement trace of the movable robot in the space according to all movement points. A previous movement point and a current movement point are displayed by different the marks.

Preferably, the map creation method further comprises: driving the movable robot to move in a pipeline, using the display device to reconstruct the plurality of captured image, to form an actual pipeline route map, comparing a pre-stored the pipeline plan route map and the actual pipeline route map, and displaying a comparison result.

Preferably, the map creation method further comprises: when the movable robot is moving, capturing the image, or performing sampling operation or a combination thereof, lighting the space where the movable robot locates.

According to above-mentioned content, the map creation system and the method thereof of the present disclosure have following advantages.

First, the movable robot can accurately move according to the instructions from the display device, to explore the internal environment of the pipeline. The robot can be used in application of decommissioning the nuclear power plant, and also applied in management of various transportation pipelines in the industry plant or the nuclear power plant, so as to prevent staff members from being damaged while the staff member explores and detects the dangerous environment. Furthermore, the technical solution of the present disclosure can solve the problem that the staff member and large-sized robots are unable to enter into the pipelines with small space and highly-complicated environment for map creation.

Secondly, the technical solution of the present disclosure provides function of simple interface, accurate positioning, low development cost and easy installation, so as to facilitate to decrease production and operation cost and to make the product more competitive.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

Figure 1:
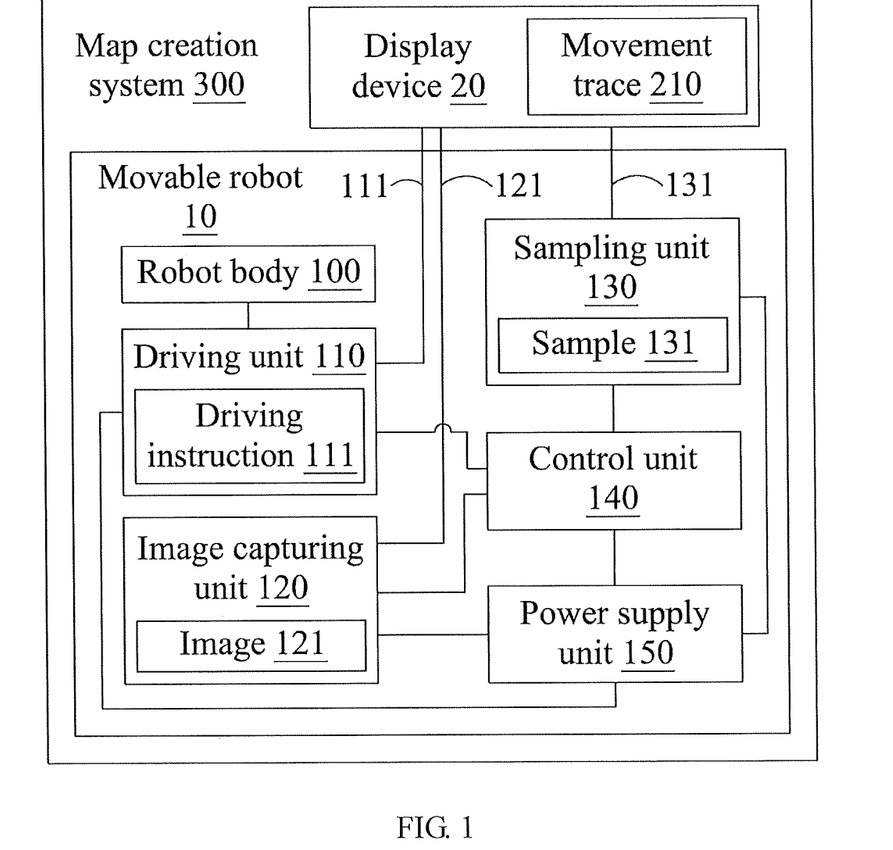
FIG. 1 is a first block diagram of a map creation system for a movable robot, in accordance with the present disclosure.
Figure 2:
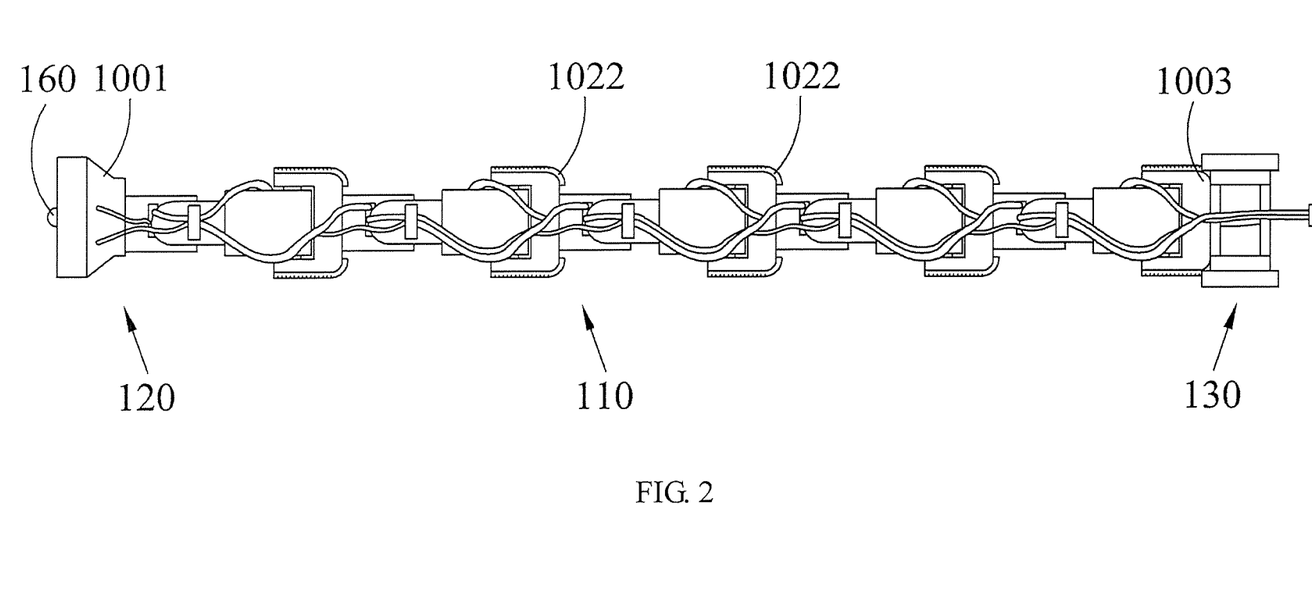
FIG. 2 is a schematic view of a map creation system for a movable robot, in accordance with the present disclosure.
Figure 3:
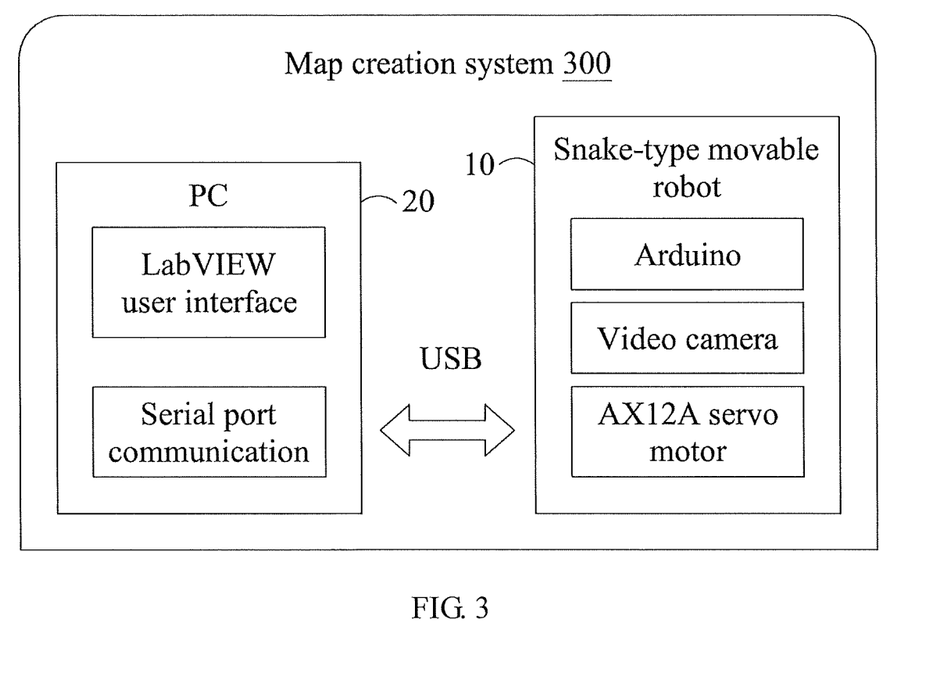
FIG. 3 is a second block diagram of a map creation system for a movable robot, in accordance with the present disclosure.

Please refer to FIGS. 1 through 3, which show a first block diagram, a schematic view and a second block diagram of a map creation system for a movable robot, in accordance with the present disclosure. As shown in FIG. 1, the map creation system comprises the plurality of movable robot 10 and a display device 20. The movable robot 10 comprises a robot body 100, a driving unit 110, an image capture unit 120, a sampling unit 130 and a control unit 140, and a power supply unit 150. The driving unit 110, the image capture unit 120, the sampling unit 130, the control unit 140 and the power supply unit 150 are disposed on the robot body 100.

In a user end of controlling the movable robot 10, the display device 20 can be, for example, a personal computer or a cell phone. The user end can use a LabVIEW control program installed inside to transmit a control instruction to control the movable robot 10 the control unit 140 of the movable robot 10. For example, the control unit 140 can be a micro Arduino pro mini microcontroller development board, which is electrically connected to the driving unit 110, the image capture unit 120 of the movable robot 10, and the sampling unit 130. When receiving a control instruction from the display device 20, the control unit 140 can directly control the driving unit 110, the image capture unit 120, and the sampling unit 130 to operate, and indirectly control the operation of the robot body 100. The following describes the detail of the operation of the robot body 100.

The robot body 100 is mechanically connected to the driving unit 110, and the driving unit 110 can drive the robot body 100 to move in the space, for example, move in the internal pipeline of the nuclear energy component of the nuclear power plant, but the present disclosure not limited thereto. As shown in FIG. 2, in order to move in the small space, such as pipeline, the robot body 100 can comprise a snake head module 1001, a snake segment module 1002 and a snake tail module 1003 which all are electrically connected to each other in a sequential order. The snake segment module 1002 comprises a plurality of joint units 1022. The driving unit 110 disposed on the snake segment module 1002 includes one motor or a plurality of motors, and the motors are in series connection with a plurality of joint units 1022. For example, ten AI servo motors can be connected in series to enable five joint units 1022 to rotate with two degrees of freedom, that is, each joint unit can rotate left, right, up and down with 300 degrees, respectively, so that the snake segment module 1002 of the robot body 100 can have 10 degrees of freedom. Each joint unit 1022 is formed by assembling two AI servo motors and two u-shaped plastic frames crossing and perpendicular to each other, For example, the motor of the movable robot 10 can be an intelligent de servo motor with a model name DYNA-MIXEL AX-12A, the communication protocol of the motor is a half duplex asynchronous serial port communication protocol, and the motor uses daisy chain series connection architecture, so that the motor circuit wiring at the robot end can be less complicated, and the snake-type robot body to do exercise can be more movable. For example, the robot body 100 can have a 15.3 kg·cm of torque and a rotational angle in a range of 0° to 300°, so that the snake-type robot body 100 can have better performance while moving within the pipeline. As shown in FIG. 3, the user can control action of the robot body 100 through the man-machine interface of the display device 20, and the display device 20 can transmit the rotational angle and revolving speed control instructions to the motor of the driving unit 110 through TTL sequence transmission manner, to control the action mode of the robot body 100.

When the snake tail module 1003 of the robot body 100 is not made by non-slip material, for example, the snake tail module 1003 is made by plastic, some non-slip pads can be pasted or attached under the bottom of the robot body 100 to provide friction for movement of the robot body 100; furthermore, the non-slip pads can also be pasted at left and right sides of the robot body 100 to prevent collision with the pipe wall when the robot body 100 is turned; furthermore, a balance pillar can be disposed under the bottom of the robot body 100 to improve balance and friction. For example, the user can apply 3D modeling software to design the balance pillar and the sample container and select PLA thermoplastic plastic material as material of the balance pillar and the sample container, and then operate a 3D printer to repeatedly stack the material to form the 3D objects.

The image capture unit 120 is disposed in the snake head module 1001 of the robot body 100. When the robot body 100 is in the moving state or static state, the image capture unit 120 can capture the image 121 in the space where the movable robot 10 locates, in an effective image capturing range. For example, the image capture unit 120 can be a video camera or other device having image capturing function, such as the video camera having maximum video resolution with 1920×1080 pixels, and maximum photograph resolution with 80 million pixels. Furthermore, the display device 20 can reconstruct the plurality of captured images 121, from the image capture unit 120, to form the actual pipeline route map. The display device 20 can compare a pre-stored pipeline plan route map with the actual pipeline route map, and display the comparison result; for example, the display device 20 can display residue on the pipe wall after liquid or gas is transported, or display corrosion state or disruption state on the used pipe wall.

In consideration of balance and spatial design of the snake robot, the sampling unit 130 can be disposed in the snake tail module 1003 of the robot body 100. When the robot body 100 is in the static state, the sampling unit 130 can perform the sampling operation on the pipe wall in the space to obtain remaining matter on the pipe wall as the sample 131, and the sample 131 can be analyzed to know whether there is poison gas, flammable gas, pollutant or corrosion dangerous to human health in the pipeline the sampling unit 130 can be a brush head electrically connected to a MG90S servo motor having the 2.0 kg of torque and the 0.11 s of speed under a 4.8 V voltage, and the rotational angle in a range of 0° to 180°, so that the brush head can be controlled to brush the bottom of the pipeline by a 120 degrees of angle or other angle, thereby obtaining sample 131. The manner of controlling the MG90S servo motor or other driving device to drive operation of the sampling unit 130 can be implemented by automatic control of the control unit 140 of the movable robot 10, or the user's remote control through the display device 20, or automatic control of the display device 20.

While the sampling unit 130 performs the sampling operation on the pipe wall, the display device 20 can displays the sampling condition of the sampling unit 130, which may be the amount, type, sampling times and sampling location of the sampling unit 130. The sampling condition can be adjusted according to length and width of the pipeline, the extension direction of the pipeline, or the transportation state of liquid or gas. In practice, the sample container can be designed to be quickly-detachable type, to protect the sample 131 obtained by the sampling unit 130 from being polluted. By using tenon design, the sampling brush head of the sampling unit 130 can be quickly replaced.

Optionally, the movable robot 10 further comprises a lighting unit such as a LED device disposed on the robot body 100; for example, the image capture unit 120 and the lighting unit both are disposed on the snake head module 1001. Within the pipeline, the robot body 100 usually moves under dark environment and the display device 20 is unable to clearly display the internal state of the pipeline, so the lighting unit can be used to light the space inside the pipeline to assist the operation of the movable robot 10; as a result, the image capture unit 120 can capture clear image, and the user can determine the sampling position according to the image 121 shown on the display device 20. In practice, the robot body 100 is provided with a lamp socket to facilitate to replace the lighting unit suitable for the space, so as to prevent the space from being too light or too dark. Preferably, the robot body 100 can have multiple lamp sockets to mount the lighting units having different brightness, and the control unit 140 is electrically connected to the lighting unit, to automatically turn on or off the lighting units with different brightness according to the automatic of the space where the robot body 100 locates.

The power supply unit 150 includes an AC-DC convertor, such as an electronic transformer, configured to convert AC power into DC power; for example, the AC-DC convertor can convert 110 v AC power into 12 v DC power, and then supply 12 v DC power to the AI servo motor of the driving unit 110, so that the AI servo motor can drive the snake segment module 1002 of the robot body 100, and the lighting unit. The image capture unit 120 applies 5 v of voltage. Furthermore, the USB-TTL convertor of the display device 20 can be electrically connected to the power supply unit 150 of the robot body 100, and the power supply unit 150 of the robot body 100 can be electrically connected to other units included in the robot body 100, so that the power supply unit 150 can receive 5V power from the display device 20 (such as PC) through the USB-TTL convertor (such as FTDI FT232R convertor), and provide power to other units included in the robot body 100, such as the control unit 140, and the MG90 motor for driving the sampling unit 130. Furthermore, the image capture unit 120 can receive 5V power from the display device 20. The voltage required by the units can be changed upon demand.

The display device 20 is electrically connected to the movable robot 10 for remote control. While the movable robot 10 acts, the display device 20 receives and displays the information associated with instructions and data of the units included in the movable robot 10. For example, the display device 20 can display the image 121 captured by the image capture unit 120 inside the pipeline, and mark the location where the sampling operation is performed, on the image 121 shown by the display screen, and simultaneously display the movement trace 210 of the robot body 100 in the space according to the plurality of driving instructions 111 of the driving unit 110.

Figure 4:
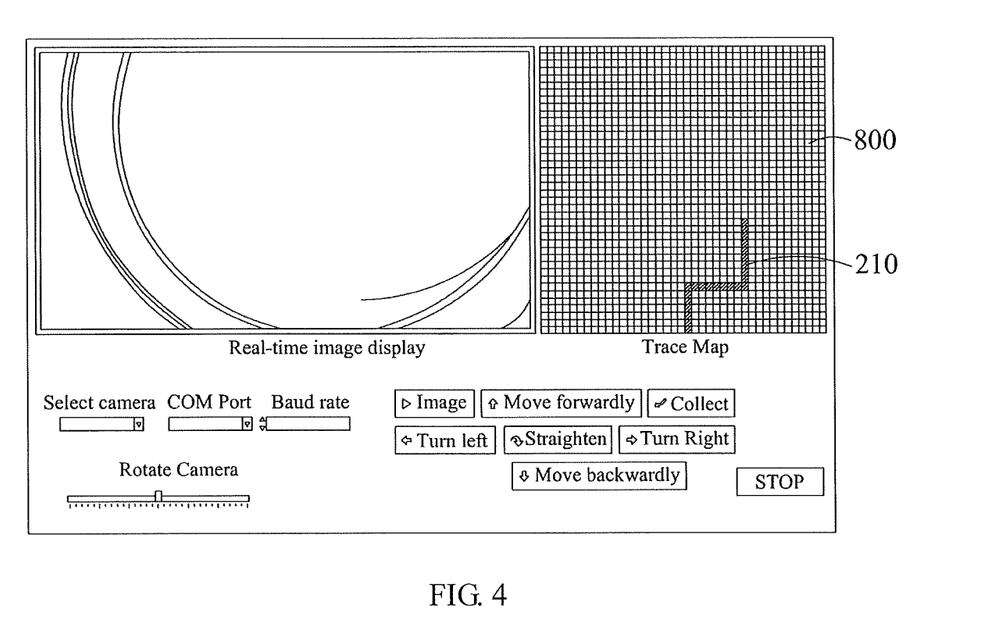
FIG. 4 is a schematic view of a display interface of a display device of the map creation system of the present disclosure.

Please refer to FIG. 4, which is a schematic view of a display interface of a display device of the map creation system of the present disclosure the display device 20 is installed with LabVIEW control program, as shown in FIG. 4, the display interface of the LabVIEW control program includes control options for a plurality of action modes, and the display device 20 uses the LabVIEW control program to transmit control instructions to the movable robot 10, so as to control the movable robot 10 to move according to the action modes, such as move forward, straighten, move backward, turn left, turn right, and collection, so as to perform above-mentioned operations. For example, the display device 20 can instruct the control unit 140 of the movable robot 10 to control movement of the robot body 100, and control the sampling unit 130 to sample.

The following describe the detail of using the display device 20 to control the movable robot 10 for map creation. First, a location where the movable robot 10 departs is set as an original point, and the movable robot 10 is controlled to move towards the end point. During movement of the movable robot 10, the display device can simultaneously display and record the movement points of the robot body 100 from the original point to the end point, on the bitmap 800, and display and record information generated during movement of the movable robot 10; for example, the information can be the sampling location of the sampling unit 130. The display device 20 can generate a movement trace 210 along which the robot body 100 moves in the space, according to all the movement points. The previous movement point and the current movement point are displayed by different the marks, for example, the previous movement points of the movable robot 10 are displayed by blue marks on the bitmap 800, and the current movement point of the movable robot 10 is displayed by a red mark on the bitmap 800, that is, the red mark indicates the location where the image capture unit 120 of the movable robot 10 captures the image; the location where the sample 131 is collected is displayed by a green mark; however, the description is mere for exemplary illustration, and the present disclosure is not limited thereto.

According to above-mentioned content, in a condition that the pipeline route map is unknown, the movable robot 10 can feedback the movement information to PC and the locations of the movable robot 10 are displayed and recorded on the bitmap 800 simultaneously, so that the movement trace of the movable robot 10 can be roughly formed based on the record of the bitmap 800. When the movable robot 10 is used to again explore the pipeline without the route map, the movable robot 10 can be controlled to move according to previous recorded movement trace.

When there is the actual pipeline route map, the display device 20 can simultaneously display the pre-stored pipeline plan route map, and the user can know the current location of the movable robot 10 according to the plurality of images 121 captured by the image capture unit 120 of the movable robot 10, and then operate the display device 20 to control movement the movable robot 10 according to the pipeline plan route map. Similarly, the recorded information can be used as reference for next movement in the same space.

Through the display interface of the control program of the display device 20, the user can know the movement state of the movable robot 10 and the environment where the movable robot 10 locates, and the user can further operate the control options for the action modes provided by the control program to control the movable robot 10. Compared with the conventional operation manner that the user can control movement of the movable robot 10 but is unable to know the movement state of the movable robot 10, the technical solution o the present disclosure can protect the movable robot 10 from being damaged, and the movable robot 10 can more accurately move in the pipeline, and it is more convenient for the user to operate the movable robot 10. Furthermore, according to the route map roughly formed by previously-recorded bitmap, the movable robot 10 can smoothly move and sample matter within the unknown pipeline, to explore the internal environment of the pipeline.

Figure 5:
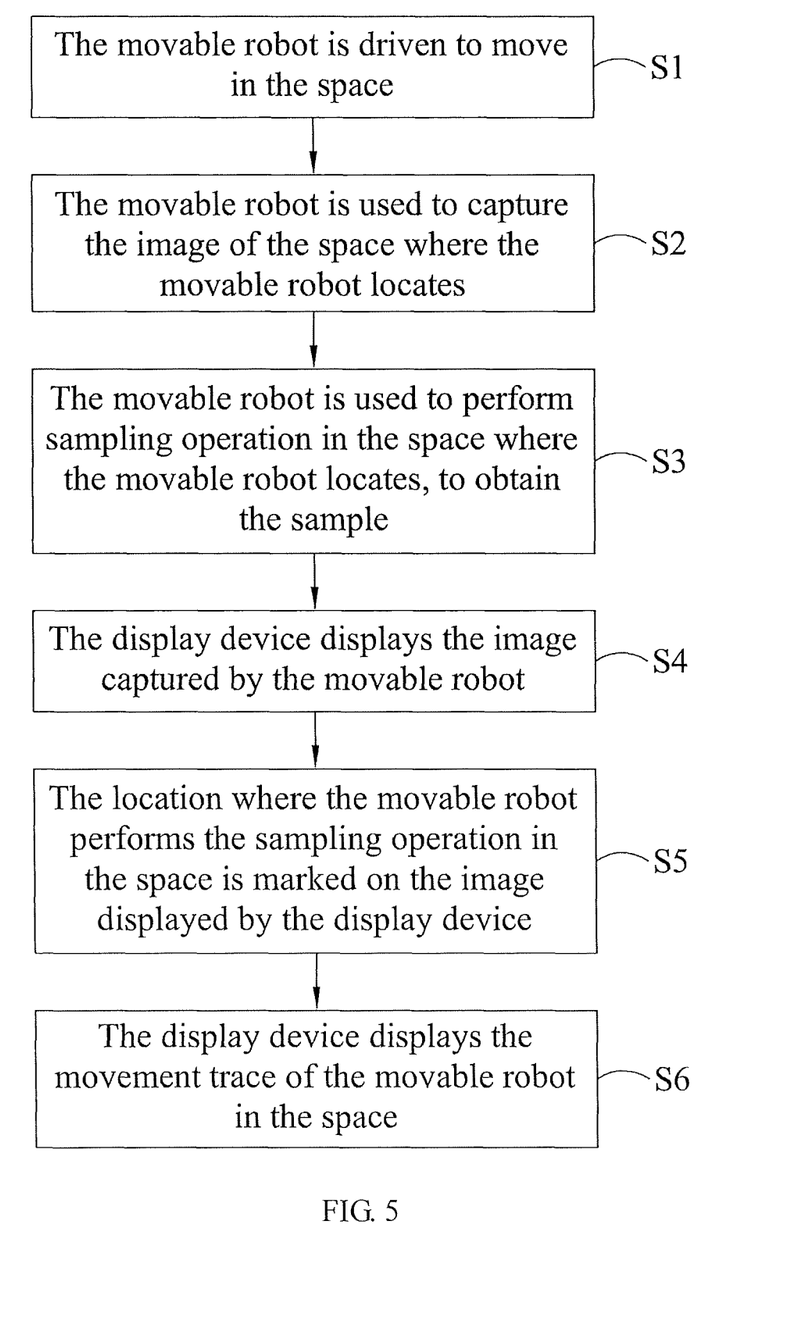
FIG. 5 is a flowchart of a map creation method for movable robot, in accordance with the present disclosure.

Please refer to FIG. 5, which shows a flowchart of a map creation method for a movable robot, in accordance with the present disclosure. The map creation method includes following steps S1~S6.

In the step S1, the movable robot is driven to move in the space according to the plurality of action modes, and the movable robot comprises the snake head module, the snake segment module and the snake tail module which all are electrically connected to each other in a sequential order. The snake segment module comprises the plurality of joint units.

In the step S2, the movable robot is used to capture the image of the space where the movable robot locates.

In the step S3, the movable robot is used to perform sampling operation in the space where the movable robot locates, to obtain the sample.

In the step S4, the display device displays the image captured by the movable robot.

In the step S5, the location where the movable robot performs the sampling operation in the space is marked on the image displayed by the display device.

In the step S6, the display device displays the movement trace of the movable robot in the space. Optionally, the previous movement point and the current movement point are displayed by different marks, the movement points of the movable robot from the original point to the end point are displayed on the bitmap, and the movement trace of the movable robot in the space is generated according to all the movement points.

Optionally, the map creation method further comprises steps of driving the movable robot to move in the pipeline; using the display device to reconstruct the plurality of captured image, to form the actual pipeline route map; comparing the pre-stored the pipeline plan route map and the actual pipeline route map; and displaying the comparison result.

Optionally, the map creation method further comprises step of lighting the space where the movable robot locates when the movable robot is moving, capturing the image, or performing sampling operation or a combination thereof.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A map creation system for a movable robot, comprising:
    a movable robot, comprising:
        a robot body movably located in a space;
        a driving unit electrically connected to the robot body and configured to drive the robot body to move in the space;
        an image capture unit disposed on the robot body and configured to capture an image in the space;
        a sampling unit disposed on the robot body and configured to perform a sampling operation in the space, to obtain a sample;
        a control unit disposed on the robot body and electrically connected to the driving unit, the image capture unit and the sampling unit for control, wherein the control unit controlled the sampling unit to rotate within 0° to 180°, and controlled the driving unit to rotate the robot body within 0° to 300°;
        a power supply unit disposed on the robot body and electrically connected to the driving unit, the image capture unit, the sampling unit and the control unit, and configured to provide power; and
    a display device electrically connected to the movable robot and configured to display the image from the image capture unit and mark a location where the sampling operation is performed in the space, on the image, and simultaneously display a movement trace of the movable robot in the space according to a plurality of driving instruction of the driving unit.

2. The map creation system according to claim 1, wherein the robot body comprises a snake head module, a snake segment module and a snake tail module which are electrically connected to each other in a sequential order, and the snake segment module comprises a plurality of joint units;
    wherein the image capture unit and the sampling unit are disposed in the snake head module and the snake tail module, respectively, and the driving unit comprises a plurality of motors which are disposed in the snake segment module and in series connection with the plurality of joint units.

3. The map creation system according to claim 1, wherein, the display device displays each of the movement points of the robot body from the original point to the end point, on a bitmap, and the display device generates the movement trace of the robot body in the space according to all movement points;
    wherein a previous movement point and a current movement point are displayed by different marks.

4. The map creation system according to claim 1, wherein, the space where the robot body locates is a pipeline, and the display device reconstructs the plurality of images, which is captured by the image capture unit, to form an actual pipeline route map;
    wherein the display device compares a pre-stored pipeline plan route map and the actual pipeline route map and display a comparison result.

5. The map creation system according to claim 1, wherein, the robot body further comprises a lighting unit disposed on the robot body and electrically connected to the power supply unit to receive power, and the lighting unit is configured to light the space where the robot body locates, to assist the operation of the movable robot.

6. A map creation method for a movable robot, comprising:
    driving the movable robot to move in a space according to a plurality of action modes;
    using the movable robot to capture an image of the space where the movable robot locates;
    using the movable robot to perform a sampling operation in the space where the movable robot locates, so as to obtain a sample;
    using the display device to display the image captured by the movable robot;
    marking a location wherein the movable robot performs the sampling operation in the space, on the image displayed on the display device; and
    using the display device to display a movement trace of the movable robot in the space; and
    wherein the movable robot comprises a snake head module, a snake segment module and a snake tail module which are electrically connected to each other in a sequential order, and the snake segment module comprises a plurality of joint units;
    wherein the snake head module is rotated within 0° to 300°, and the snake tail module is rotated within 0° to 180°.

7. The map creation method according to claim 6, further comprising:
    displaying movement points of the movable robot from an original point to an end point on the bitmap, and generating a movement trace of the movable robot in the space according to all movement points, wherein a previous movement point and a current movement point are displayed by different the marks.

8. The map creation method according to claim 6, further comprising:
    driving the movable robot to move in a pipeline, using the display device to reconstruct the plurality of captured image, to form an actual pipeline route map;
    comparing a pre-stored pipeline plan route map with the actual pipeline route map; and
    displaying a comparison result.

9. The map creation method according to claim 6, further comprising:
    lighting the space where the movable robot locates when the movable robot is moving, capturing the image, or performing the sampling operation, or a combination thereof.

* * * * *